(12) United States Patent
Carlson et al.

(10) Patent No.: US 6,358,153 B1
(45) Date of Patent: Mar. 19, 2002

(54) VIBRATION DAMPING DEVICE

(75) Inventors: Cora Carlson, Dittelbrunn; Bernd Peinemann; Jürgen Weth, both of Niederwerrn, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/517,291

(22) Filed: Mar. 2, 2000

(30) Foreign Application Priority Data

Mar. 16, 1999 (DE) .......................... 199 11 561

(51) Int. Cl.⁷ ................................................ F16D 3/12
(52) U.S. Cl. .................... 464/68; 188/378; 188/379; 74/573 R
(58) Field of Search .................. 464/68; 74/573 R, 74/573 F, 574; 188/378, 379, 380, 73.35–73.38

(56) References Cited

U.S. PATENT DOCUMENTS

| | | | |
|---|---|---|---|
| 1,838,023 A | 12/1931 | Manville | |
| 2,103,643 A | 12/1937 | Salomon | |
| 2,317,983 A | 5/1943 | Fischer | |
| 5,351,574 A | 10/1994 | Hiraishi et al. | |
| 5,751,202 A | 5/1998 | Seino | |
| 5,829,318 A | * 11/1998 | Hannah et al. | ........... 74/573 R |
| 5,884,735 A | * 3/1999 | Eckel et al. | ................ 188/378 |

FOREIGN PATENT DOCUMENTS

| | | |
|---|---|---|
| DE | 802 976 | 2/1951 |
| DE | 40 068 | 4/1960 |
| DE | 32 28 738 | 4/1983 |
| DE | 33 09 928 | 9/1984 |
| DE | 33 22 368 | 1/1985 |
| DE | 38 39 436 | 5/1990 |
| DE | 42 00 174 | 8/1992 |
| DE | 44 26 317 | 2/1995 |
| DE | 195 44 832 | 6/1997 |
| DE | 197 21 926 | 12/1997 |
| DE | 198 14 502 | 11/1998 |
| GB | 2 123 371 | 2/1984 |
| JP | 10306851 | * 11/1998 |
| JP | 11294528 | * 10/1999 |
| JP | 2000-18329 | * 1/2000 |
| WO | WO 93/23687 | 11/1993 |
| WO | WO 96/17185 | 6/1996 |

* cited by examiner

*Primary Examiner*—Lynne H. Browne
*Assistant Examiner*—Aaron M Dunwoody
(74) *Attorney, Agent, or Firm*—Cohen, Pontani, Liberman & Pavane (57) ABSTRACT

A vibration damping device for a drive system of a motor vehicle includes a base body rotatable about an axis of rotation (A) and a deflection mass arrangement arranged in the base body having at least one deflection mass and a deflection path associated with the at least one deflection mass and along which the at least one deflection mass is movable during rotation of the base body about the axis of rotation. The deflection path has a vertex area and deflection areas emanating from the vertex area in opposite directions. The deflection areas proceed from the vertex area in substantially opposite axial directions.

12 Claims, 12 Drawing Sheets

VIBRATION DAMPING DEVICE

BACKGROUND OF THE INVENTION

1. Field of the Invention

The present invention is directed to a vibration damping device for a drive system of a motor vehicle having a base body arranged for rotating about an axis of rotation and a deflection mass arrangement arranged in the base body and having at least one deflection mass and a deflection path associated with the at least one deflection mass and along which the deflection mass is movable during rotation of the base body about the axis of rotation, the deflection path having a vertex area and deflection areas proceeding in opposite directions from the vertex area.

2. Description of the Related Art

A vibration damping device is disclosed in German reference DE 44 26 317 A1 having a plurality of deflection paths arranged in a base body and distributed about an axis of rotation of the base body. Deflection masses arranged in the base body are movable along these deflection paths which extend in the circumferential direction from vertex areas and curved toward the axis of rotation of the base body. During rotary operation of the base body, centrifugal forces arrange the deflection masses in respective vertex areas of the deflection paths, the vertex areas having the greatest radial distance from the axis of rotation. In the event of irregularities in the rotating speed, for example, as a result of rotational irregularities in an internal combustion engine drive, the deflection masses are deflected from their rest position in the vertex areas by these irregularities in rotational speed and move along their deflection paths in an oscillating manner. Higher harmonic orders of vibrational excitations in particular may be damped by so-called speed-adaptive dampers as described above. These dampers are adaptable to a specific vibration frequency to be damped through the selection of the radii of curvature of the curved paths and through the selection of the masses and dimensions of the respective deflection masses.

However, a problem with these prior art devices occurs when additional vibrational excitations occur, especially vibrational excitations of a different frequency or type. For example, when the above described vibration damper is used in a drivetrain in a motor vehicle between the crankshaft of an internal combustion engine and a transmission input shaft, an axial offset or axial inclination may be generated which forces the components of a clutch that are coupled together effect wobbling movements. Such wobbling movements also occur at certain frequencies and may impair the drive system.

SUMMARY OF THE INVENTION

It is the object of the present invention to further develop a vibration damping device that provides an improved damping function with respect to additional vibrational excitations.

The object is met according to a first embodiment of the present invention by a vibration damping device a motor vehicle drive system comprising a base body which is rotatable about an axis of rotation and deflection mass arrangement arranged in the base body and having at least one deflection mass and a deflection path associated with the at least one deflection mass and along which the deflection mass is movable during rotation of the base body about the axis of rotation. The deflection path has a vertex area and deflection areas proceeding in opposite directions from the vertex area.

The deflection areas proceed from the vertex area in substantially opposite axial directions. According to this embodiment, the deflection path extends substantially in the axial direction. The deflection area proceeding in the axial direction curves toward the axis of rotation of the base body. Therefore, the deflection mass moves substantially in a plane containing the axis of rotation. This movement of the deflection mass is substantially orthogonal to the movement direction of commonly known deflection masses and may be used to damp or eliminate wobbling excitations of the rotatable base body.

To further compensate for fluctuations in the rotational speed of the rotating system which are known per se and which originate, for example, from out-of-true running of an internal combustion engine, the deflection path associated with the at least one deflection mass has further deflection areas which proceed from the vertex area in substantially opposite circumferential directions.

In this embodiment, every deflection mass may accordingly move in an axial direction and in a circumferential direction, wherein an approach to or a distancing from the axis of rotation of the base body occurs in both the axial direction movements and the circumferential movements as a result of the curvature of the different paths. The deflection areas in the axial direction are connected with the additional deflection areas in the circumferential direction to form a deflection field for the associated deflection mass, wherein this deflection field faces the axis of rotation and is curved toward the axis of rotation. Accordingly, the at least one deflection body moves on a surface which is curved in three-dimensional space.

To arrange the movements such that they are as identical as possible in any direction, the at least one deflection mass forms a substantially spherical deflection body.

In a further embodiment of the present invention, the object of the invention is met by a vibration damping device for a motor vehicle drive system comprising a base body arranged for rotating about an axis of rotation and a deflection mass arrangement arranged in the base body having a plurality of deflection masses and a deflection path associated with every deflection mass and along which the deflection masses are movable during rotation of the base body about the axis of rotation.

This embodiment further comprises at least two deflection masses having a different mass and/or a different mass moment of inertia.

By providing different masses or mass moments of inertia in a plurality of deflection masses, each of these different deflection masses forms an oscillator with a different natural frequency. In this way, different excitations occurring in the rotating system at different frequencies may be simultaneously reduced.

This result may also be achieved by incorporating two differently configured deflection paths in addition to or instead of the two different masses or mass moments. The different paths may, for example, have a different curvature shape or have a different radial positioning with respect to the axis of rotation.

In an arrangement of this kind, the different deflection masses or deflection paths may be arranged so as to follow one another in the circumferential direction and/or arranged so as to follow one another in the axial direction depending on space considerations.

The above-stated object of adapting to very different frequency ratios is met according to another embodiment of the present invention in that at least one deflection path extends at least partly in a viscous damping medium. In addition, the natural frequency of the oscillator generated in this way may accordingly be influenced due to the fact that the deflection mass moving along the path must move in the medium and against increased resistance.

In this embodiment, a plurality of deflection paths may be arranged following one another in the circumferential direction. Each of the deflection paths defines a respective damping medium chamber and at least two of the damping medium chambers are connected with one another by a channel arrangement. In an arrangement of this type, the damping medium fluid may be displaced back and forth between the individual damping medium chambers. The back-and-forth displacement also has a determined natural frequency and therefore influences the oscillation behavior of the damper.

In this connection, the channel arrangement may open into the respective deflection paths defining the damping medium chamber.

Further, a channel arrangement may be arranged in the at least one deflection mass for the entrance of or passage of damping medium.

The viscous damping medium may comprise a damping fluid, for example. However, an easily displaceable material in powder form may alternatively be used for this purpose.

According to a further embodiment of the present invention, the above-stated object is met in that a friction arrangement is provided in damping devices of the type mentioned above for generating a frictional force opposing the movement of the at least one deflection mass.

The frictional force may be generated, for example, by the fluid or damping medium mentioned above. However, the friction arrangement may also comprise a pretensioning arrangement through which at least one deflection mass is pressed against an abutment arrangement.

With respect to construction, the friction arrangement may comprise a first wall area and a second wall area arranged at the base body, the at least one deflection mass being positioned between this first wall area and second wall area, and a pretensioning spring which acts between the at least one deflection mass and one of the first and second wall areas.

According to a further embodiment of the present invention, the object stated above is met in that the at least one deflection mass comprises a support bearing arrangement for supporting the deflection mass on the associated deflection path. In this way, the essential mass component of a deflection mass does not rotate even when rolling on the deflection path, since the rolling movement is received in the bearing arrangement. Accordingly, the energy introduced in the movement of the respective body is influenced in a defined manner. Only the kinetic energy of the movement along the path and no rotational energy is changed into the movement of the respective body.

For example, the support bearing arrangement may comprise a sliding bearing arrangement or a rolling body bearing arrangement.

The damping behavior of an oscillator of this kind may also be influenced in that the oscillating mass is compulsorily held in a determined position, i.e., can only execute a defined movement, and is stabilized in other directions. This especially prevents unwanted and undefined frictional contact with other components. According to another feature of the present invention, this result may be achieved in that the at least one deflection mass and the associated deflection path have a mutual contact profile such that the at least one deflection mass is stabilized in its position essentially in a plane containing the deflection path.

In this case, the at least one deflection mass may comprise an outer circumferential area with a substantially V-shaped surface profile. The associated deflection path also comprises a substantially complementary V-shaped path profile.

The vibration behavior may be further influenced in that the at least one deflection mass has at least one guide axle which is guided at a guide path at the base body or a component connected therewith, and in that the guide path for the at least one guide axle forms, at least partly, the deflection path for the associated deflection mass. The at least one guide axle proceeds from the deflection mass in this case and generates a rotation of the deflection mass when this guide axle rolls over the associated path. At a given deflection speed, that is, at a given movement speed of the body along the deflection path, the deflection body having a guide axle rotates at a substantially higher speed than a deflection body rolling on its outer circumferential surface. This result is exhibited because the guide axle has a smaller diameter than the deflection mass. As a result, a considerable proportion of rotational energy is changed in a defined manner into the moving deflection mass, which results in a corresponding damping or eradicating behavior.

For stabilizing the movement of the deflection mass, two oppositely arranged guide axles with associated guide paths may be arranged at the at least one deflection mass.

To rule out undefined friction losses as far as possible in this connection also, the at least one guide axle may be guided at the associated guide path with the intermediary of a bearing arrangement.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

FIGS. 1 through 4 show various areas in which a damping device 30 according to the present invention may be used. FIGS. 5 through 16 show the various embodiments of damping devices according to the present invention which may be used in any of the areas shown in FIGS. 1 through 4.

Figure 1:
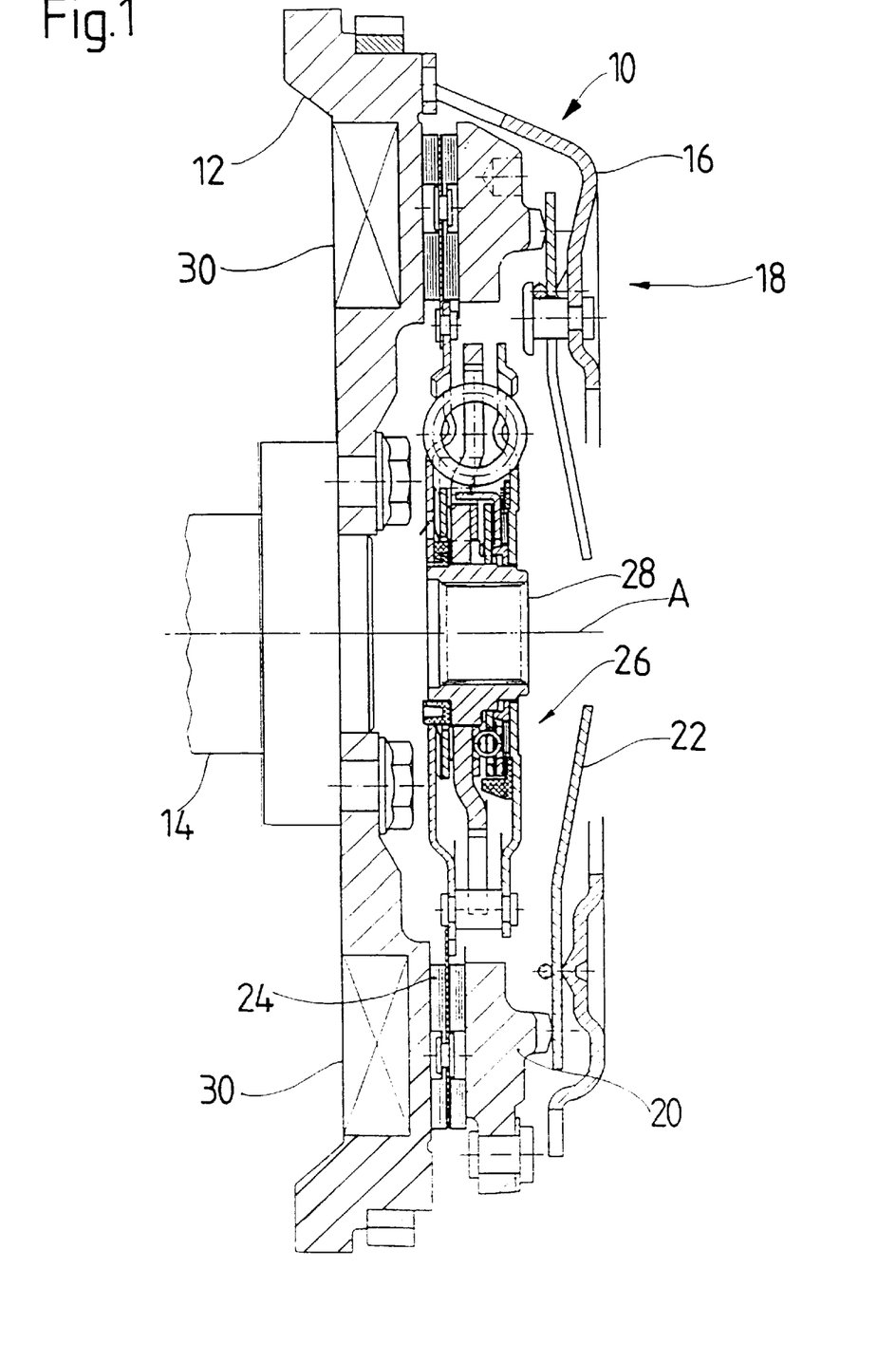
FIGS. 1–4 show longitudinal sectional views of different embodiments of friction clutches and multiple-mass flywheels schematically showing the different positions in which a vibration damper according to the present invention may be arranged.

FIG. 1 is a sectional view of a clutch mechanism 10 with a flywheel 12 connected to a crankshaft 14 of an internal combustion engine so that the crankshaft 14 is fixed with respect to rotation relative to the flywheel 12. The radial outside of the flywheel 12 carries a housing 16 of a thrust plate assembly 18. A pressure plate 20 is contained, in a manner known per se, in the thrust plate assembly 18 and may be pressed axially on the flywheel 12 by a diaphragm spring 22 so that friction facings 24 of a clutch disk 26 may be clamped between the pressure plate 20 and the flywheel 12. The clutch disk 26 may be coupled with a transmission input shaft so as to be fixed with respect to rotation relative to it via a hub 28.

Figure 2:
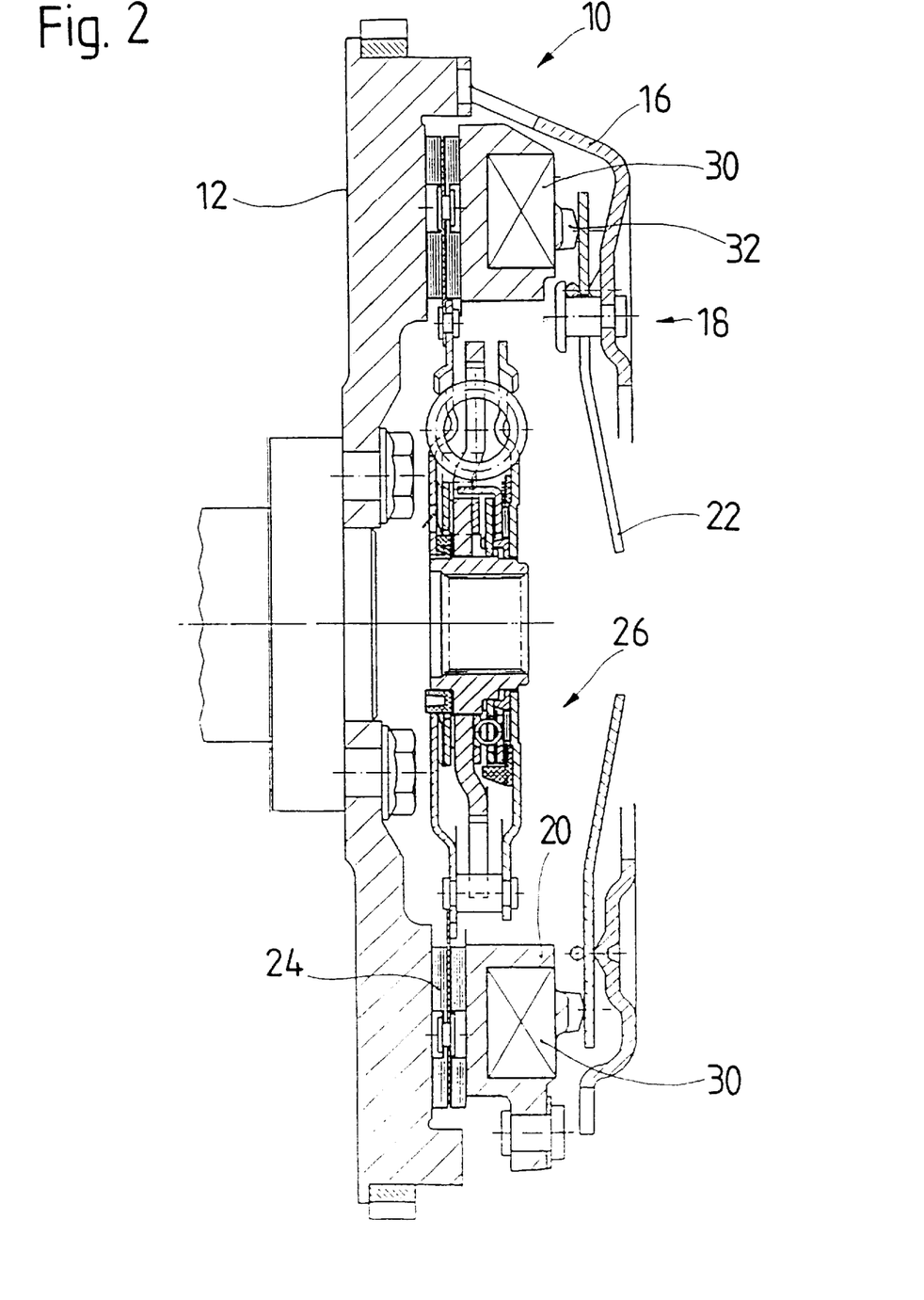
Figure 3:
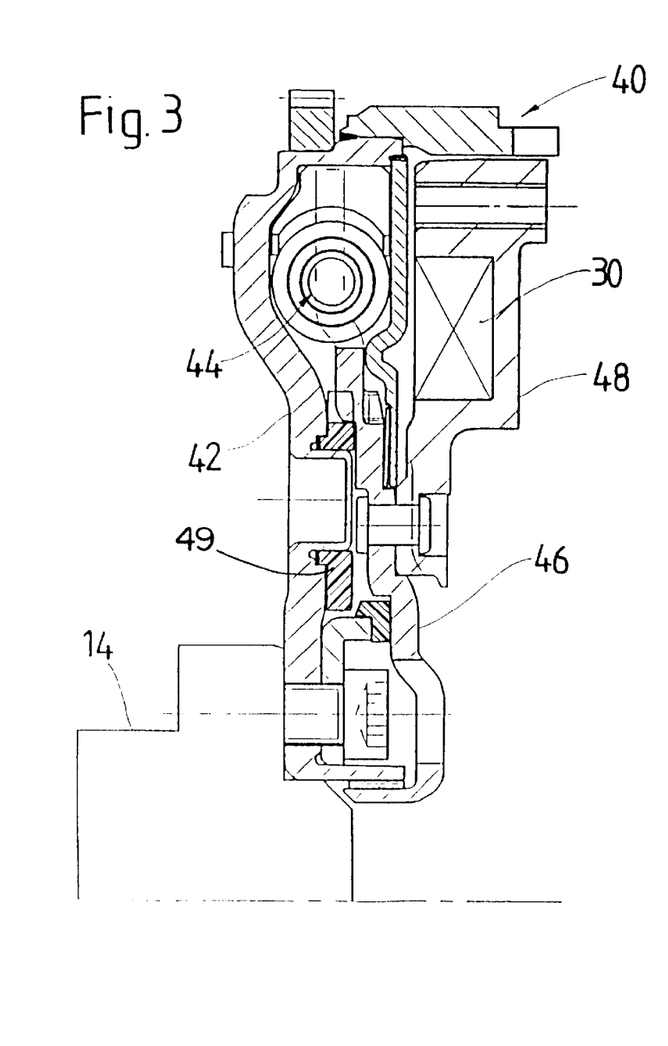

FIG. 1 further shows a schematically indicated vibration damping device 30 comprising a plurality of deflection masses, to be described hereinafter, which are distributed in the circumferential direction about the axis of rotation A. The vibration damping device 30 is positioned in a radial outer area of the flywheel 12 and can accordingly damp torsional vibrations generated directly in the area of the internal combustion engine. Alternatively, FIG. 2 shows the position of the vibration damping device 30 in the area of the pressure plate 20. In this embodiment, a plurality of deflection masses may be distributed in the circumferential direction and supporting areas 32 may be provided between these individual deflection masses so that the pressure plate 20 may be acted upon by the diaphragm spring 22. FIG. 3 is a partial longitudinal sectional view of a multiple-mass flywheel 40 comprising a primary flywheel mass 42 connected with a crankshaft 14 so as to be fixed with respect to rotation relative to it. The primary flywheel mass 42 is connected with a hub disk 46 so as to be rotatable relative to it by a spring damping mechanism 44, known per se. The hub disk 46 is coupled with a secondary-side flywheel mass 48 so as to be fixed with respect to rotation relative to it. Furthermore, a plurality of planet gears 49 supported at the primary flywheel mass 42 are driven in rotation in the manner of a planetary gear set by the hub disk 46. When torsional vibrations occur, the two flywheel masses 42, 48 are rotatable relative to one another against the spring action of the spring arrangement 44 on the one hand and the planet gears 49 are driven in rotation during this relative rotational movement on the other hand. It will be seen that the vibration damping device 30 is positioned in the area of the secondary flywheel mass 48 which ultimately forms the flywheel mass for the clutch (flywheel 12 of FIGS. 1 and 2).

Figure 4:
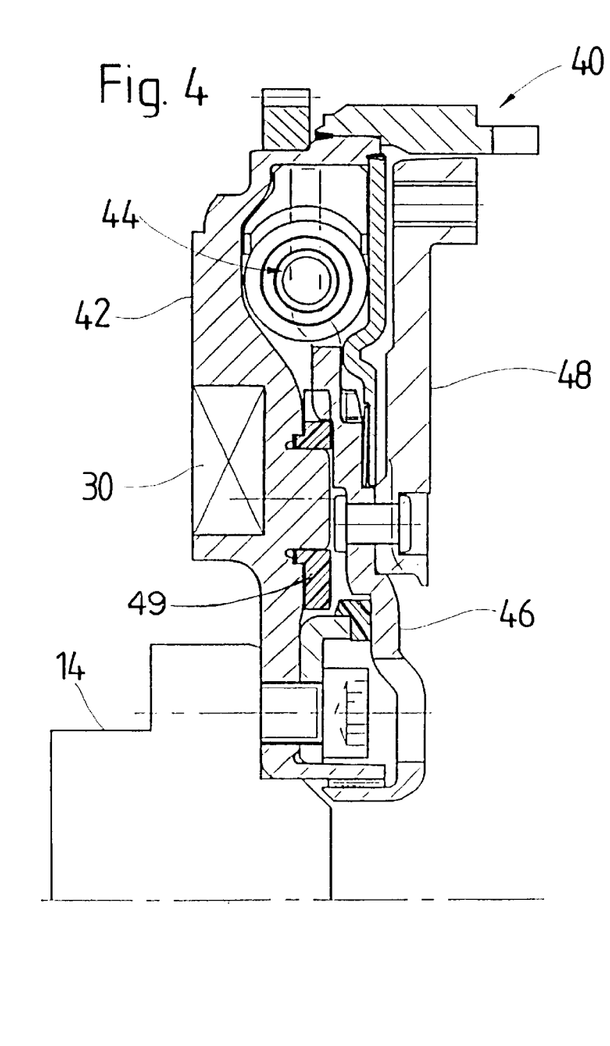

FIG. 4 also discloses a multi-mass flywheel 40. However, in FIG. 4, the vibration damping device 30 is positioned in the area of the primary-side flywheel mass 42.

The preceding brief description of the different areas in which the damping device 30 may be integrated in a multiple-mass flywheel or a motor vehicle clutch reveal that the damping behavior may already be influenced regardless of the actual construction of a damping device of the kind described because a different effective ratio or functional ratio is generated between the exciting vibration and the vibration damping device, depending on the area of the positioning.

Figure 5:
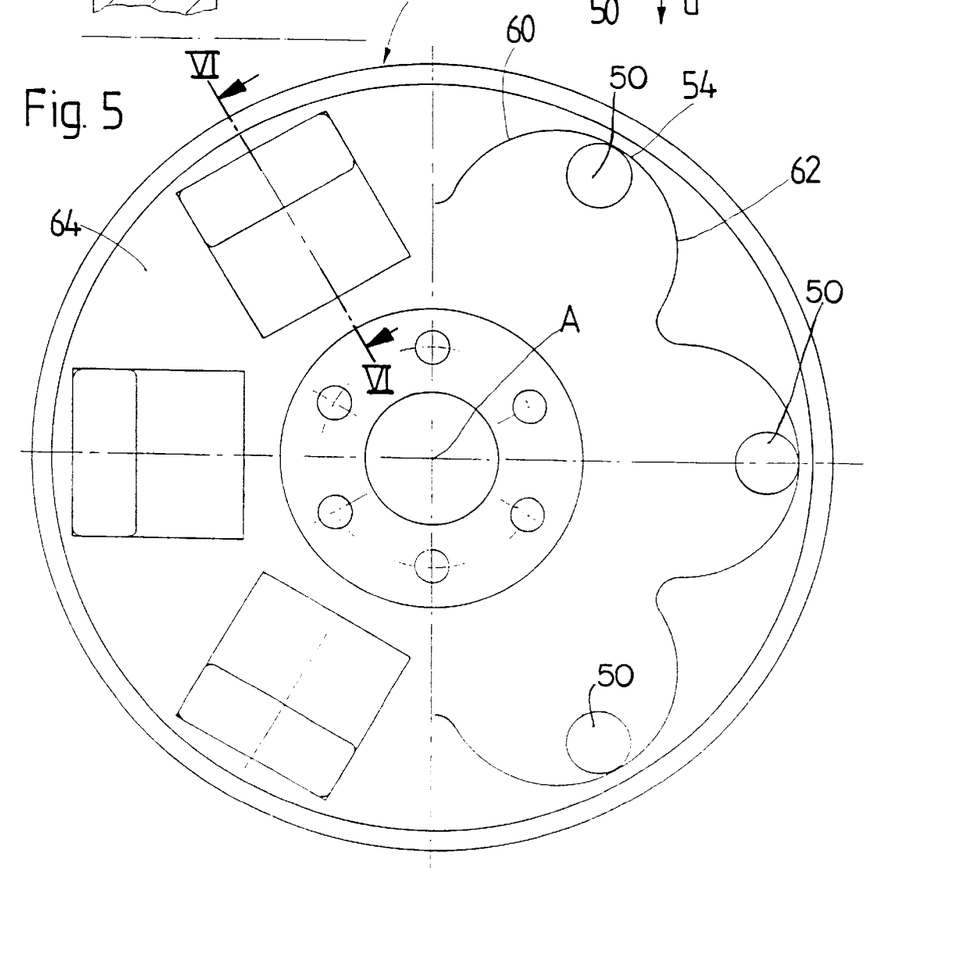
FIG. 5 is a partial axial sectional view of a first embodiment of a damping device according to the present invention.
Figure 6:
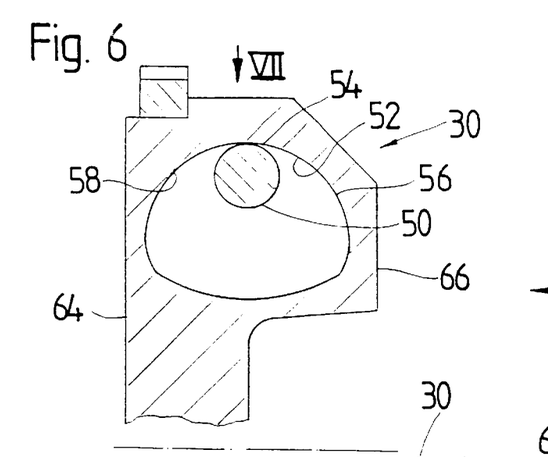
FIG. 6 is a sectional view of the damping device through line VI—VI in FIG. 5.
Figure 7:
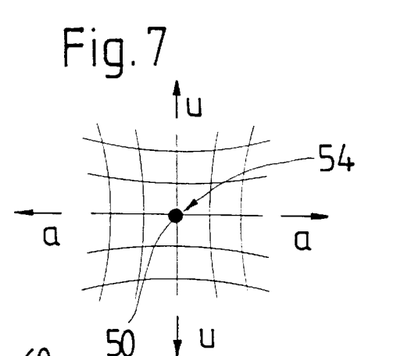
FIG. 7 is a radial view of deflection areas of the damping device viewed along direction VII in FIG. 6 showing a schematic developed view of the rolling surface for a deflection mass.

FIGS. 5–7 show a first embodiment of the above-described vibration damping device 30.

The embodiment form of the vibration damper 30 shown in FIGS. 5–7 may be used for damping torsional vibrations arising, for example, from irregular vibrational excitation caused by ignition explosions in an internal combustion engine and for the damping of vibrations excited by wobbling movements. For this purpose, as is shown in FIG. 5, six individual deflection masses 50 which have a spherical shape in the present instance are distributed along a circumference. A deflection path 52 having a three-dimensional curved surface in the present embodiment form is associated with each deflection mass 50. Referring now also to FIG. 6, each of the deflection paths 52 of the deflection bodies 50 has a vertex area 54 in a radial outer region. Furthermore, deflection areas 56, 58 proceed from this vertex area 54 in opposite directions and in a plane containing the axis of rotation A. These deflection areas 56, 58 are curved so that they increasingly approach the axis of rotation A as their distance from the vertex area 54 increases. When wobbling movements occur which create a vibrational excitation directed along the axis of rotation A for the deflection masses 50, the individual deflection masses 50 swing back and forth along their respective deflection paths 52 in the direction of the axis of rotation A. Accordingly, a deflection in direction a,a takes place in the deflection path 52 as shown in FIG. 7.

FIG. 5 shows that the deflection path 52 includes additional deflection areas 60, 62 proceeding from the vertex areas 54 and extending away from vertex area 54 in opposing circumferential directions. Accordingly, the individual deflection bodies 50 may also be deflected out of their position associated with the vertex areas 54 into a direction u,u according to FIG. 7. Accordingly, the deflection path 52 has a deflection surface which is curved three-dimensionally and which approaches the axis of rotation proceeding from vertex area 54. FIG. 7 illustrates this surface as a plane developed surface. Accordingly, torsional vibrations occurring in any rotary operation and which provide excitation in the circumferential direction may also be damped. Accordingly, there will be a superimposed excitation in direction u,u and in direction a,a, respectively, in FIG. 7, so that the respective deflection masses 50 are moved, for example, approximately on a circular or elliptic orbit around the vertex areas 54.

With deflection movements of this type, it is advantageous to ensure that the oscillators provided by the individual deflection bodies 50 have a natural frequency which is substantially independent from the deflection amplitude. If the deflection path is circular, the oscillator is independent of frequency for only very small deflection angles. However, the use of epicycloidal paths maintain the independence from the deflection amplitude for much higher amplitudes. Therefore, the deflection paths 52 are shaped in such a way that the centers of mass of the deflection masses move on epicycloidal paths in the preferred embodiment. Both the deflection areas 56, 58 extending in the axial direction and the deflection areas 60, 62 extending in the circumferential direction may comprise epicycloidal paths so that the amplitude and the natural frequency are decoupled for large deflections.

The vibration damping device 30 is arranged in a base body 64. A bulge area 66 extending axially away from a base body 64 creates sufficient installation space to receive the deflection paths 52 in their entirety. Furthermore, a closure or termination may be provided on the radial inside at the same time so that the individual deflection masses 50 are held in a definite manner in their respective deflection paths 52. Due to the relatively weak vibrational excitation during wobbling movements (compared to torsional excitations), the length of the respective deflection paths or deflection areas 56, 58 may be shorter in the axial direction than the deflection areas 62, 60 provided for the damping of torsional vibrations, which meets the situation with respect to installation space in the axial direction.

It is noted that in a rotating system in which the occurrence of torsional vibrations is not expected, a deflection paths 52 may be arranged so that the deflection masses 50 move only along the deflection areas 56, 58 extending in the axial direction away from the vertex area 54 and not in the circumferential direction. Furthermore, paths in which the deflection masses may be deflected in only the circumferential direction may be combined with paths in which the deflection masses may be deflected in both the circumferential direction and the axial direction in any desired manner. Differently configured deflection paths of this kind may be arranged to follow one another in an alternating manner in the circumferential direction, for example, so that a path with deflection in the axial direction can be followed by a path with deflection in the circumferential direction or, for example, by a path with deflection in both the axial direction and the circumferential direction, followed again by a path with deflection in the axial direction.

It is further noted that an embodiment form of a vibration damper such as is shown in FIGS. 5 to 7 may be used in all of the arrangements shown above with reference to FIGS. 1 to 4. In this respect, the base body 64 may comprise one of the flywheel mass parts which were described above.

Figure 8:
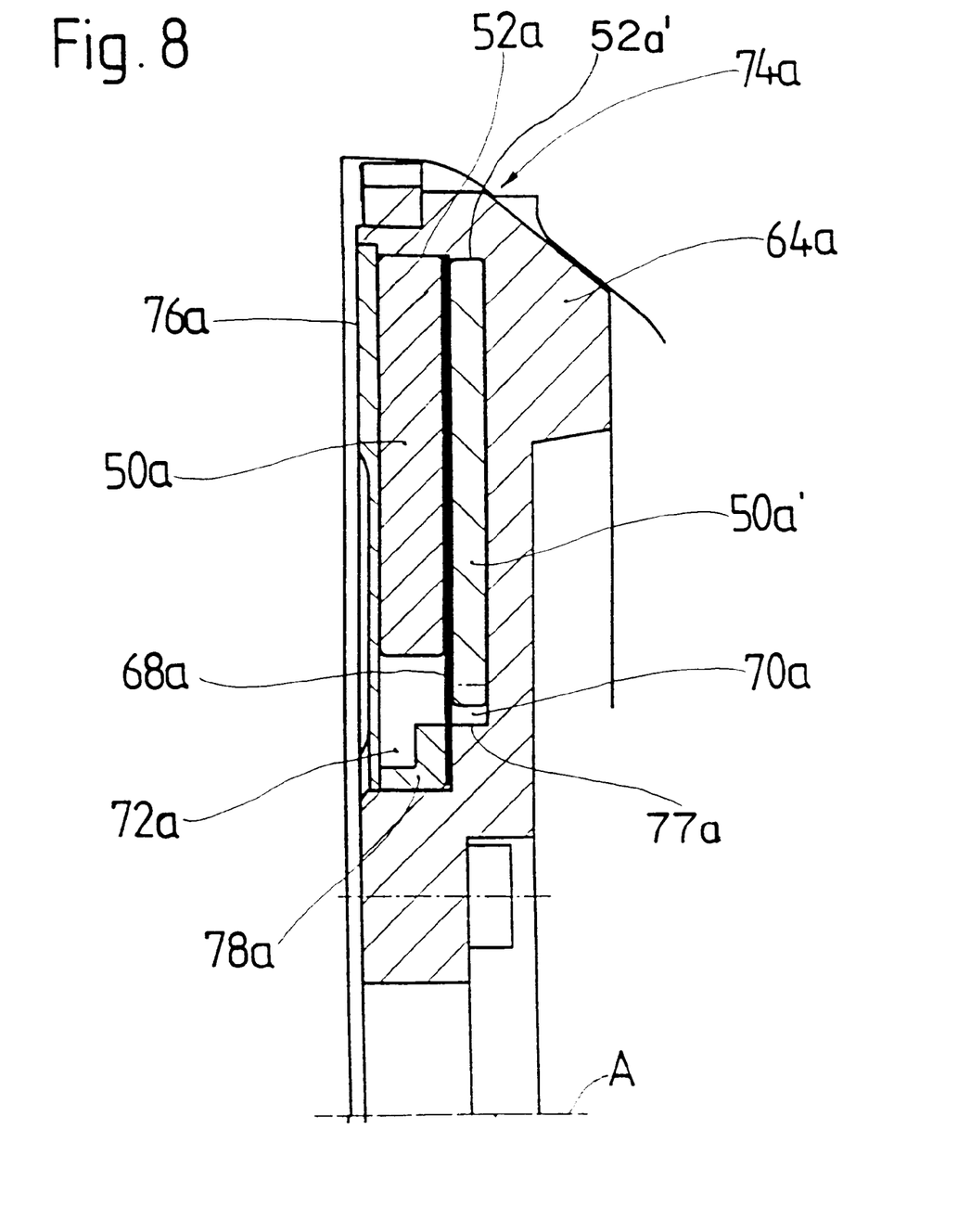
FIG. 8 is a partial longitudinal sectional view of a damping device according to the present invention.
Figure 9:
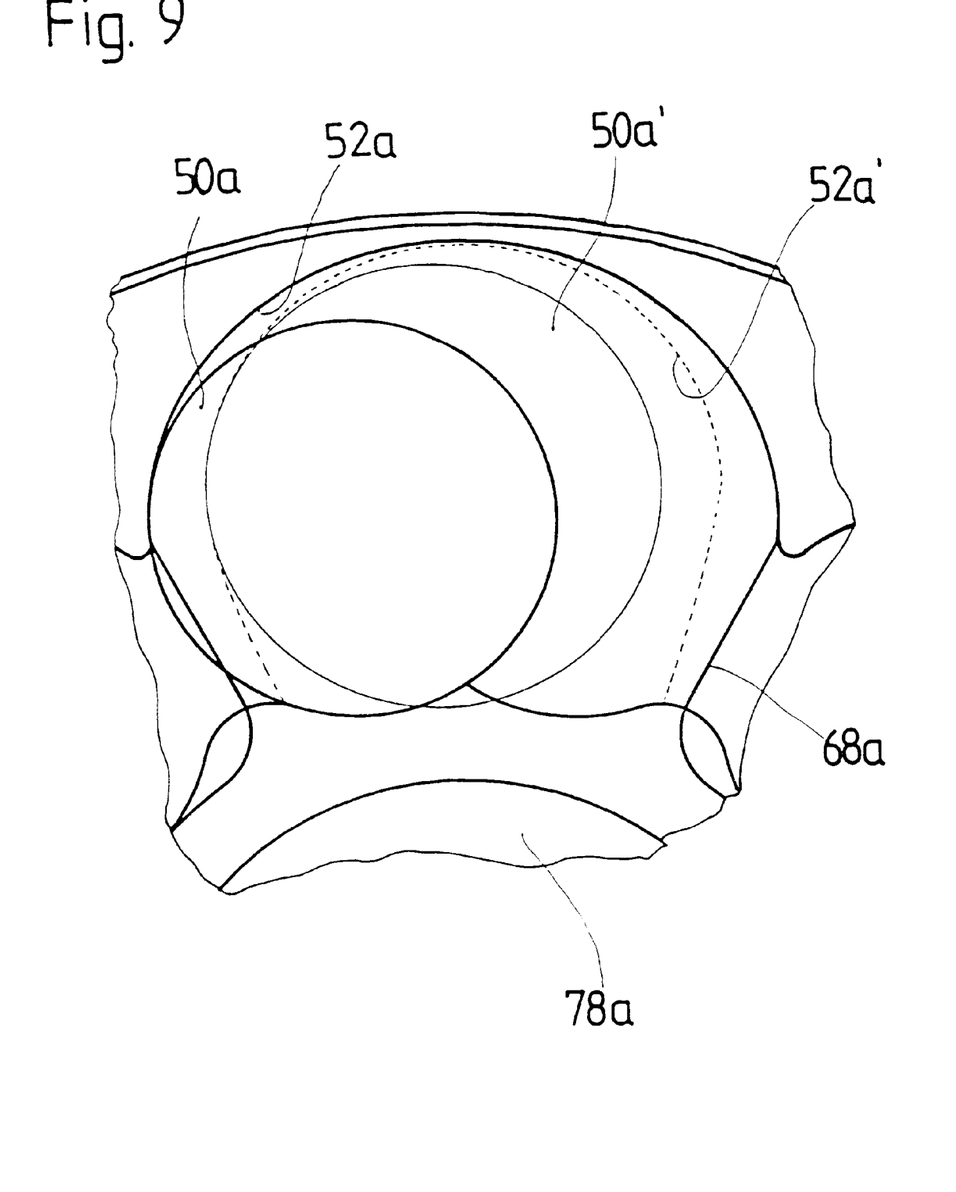
FIG. 9 is a partial axial view schematically showing the damping device of FIG. 8 and showing the rolling behavior of the different deflection masses.

FIGS. 8 and 9 show another embodiment of a vibration damper according to the invention. Components which correspond with respect to construction and function to the components described above are provided with the same reference numbers but with the addition of a suffix "a" appended thereto.

In this embodiment form, a plurality of deflection path arrangements 74a are provided in the base body 64a. The plural deflection path arrangements 74a are distributed along the circumferential direction and each comprises first and second deflection paths 52a, 52a' which follow one another in the axial direction. The first and second deflection paths 52a and 52a' are respectively arranged in first and second stepped recesses 72a, 70a. The second recess area 70a lies below the first recess area 72a in the base body 64a. The radial outside of the second recess area 70a forms the first deflection path 52a' for a second deflection mass 50a' and the radial outside of the first recess area 72a forms the first deflection path 52a for the first deflection mass 50a. The first and second deflection masses 50a, 50a' are essentially circular-cylindrical. As is apparent in FIGS. 8 and 9, the first and second deflection masses 50a, 50a' are constructed differently. Thus, the first deflection mass 50a has a smaller diameter, but a greater axial thickness than that of the second deflection mass 50a'. Furthermore, the second deflection path 52a' has a sharper curvature than the first deflection path 52a. In cooperation with the differently configured first and second deflection paths 52a and 52a', two different oscillators are provided for damping or eliminating different excitation frequencies. Through suitable selection of the parameters consisting of mass, moment of inertia and curvature of deflection path, each oscillator may be adapted to a determined frequency to be damped in a simple manner. The first and second deflection paths 52a, 52a' preferably have epicycloidal shapes to provide a natural frequency of the individual oscillators that is independent from the amplitude of deflection.

Furthermore, an intermediate plate 68a which holds the second deflection mass 50a' in the second recess area 70a is located between the first and second recess areas 70a, 72a. A cover plate 76a is arranged on the base body 64a to ensures that the first deflection mass 50a also remains in the first recess area 72a. A stop is formed on the radial inside of the second recess area 70a for the second deflection mass 50a' by a hub area 77a of the base body 64a. This stop limits the movement of the second deflection mass 50a' in the circumferential direction. A stop ring 78a arranged in the radial inner area of the fist recess 72a provides this function for the first deflection mass 50a.

It is further noted that deflection paths distributed in the circumferential direction and their associated deflection masses may be configured differently to achieve the damping of different excitation energies. For example, in the embodiment form according to FIG. 5, every second path may comprise a different radius of curvature and every second deflection mass may have a different mass or a different mass moment of inertia. This arrangement may be used in addition in the configuration of the axial staggering of a several deflection masses shown in FIG. 8 to damp of a large number of excitation frequencies.

Figure 10:
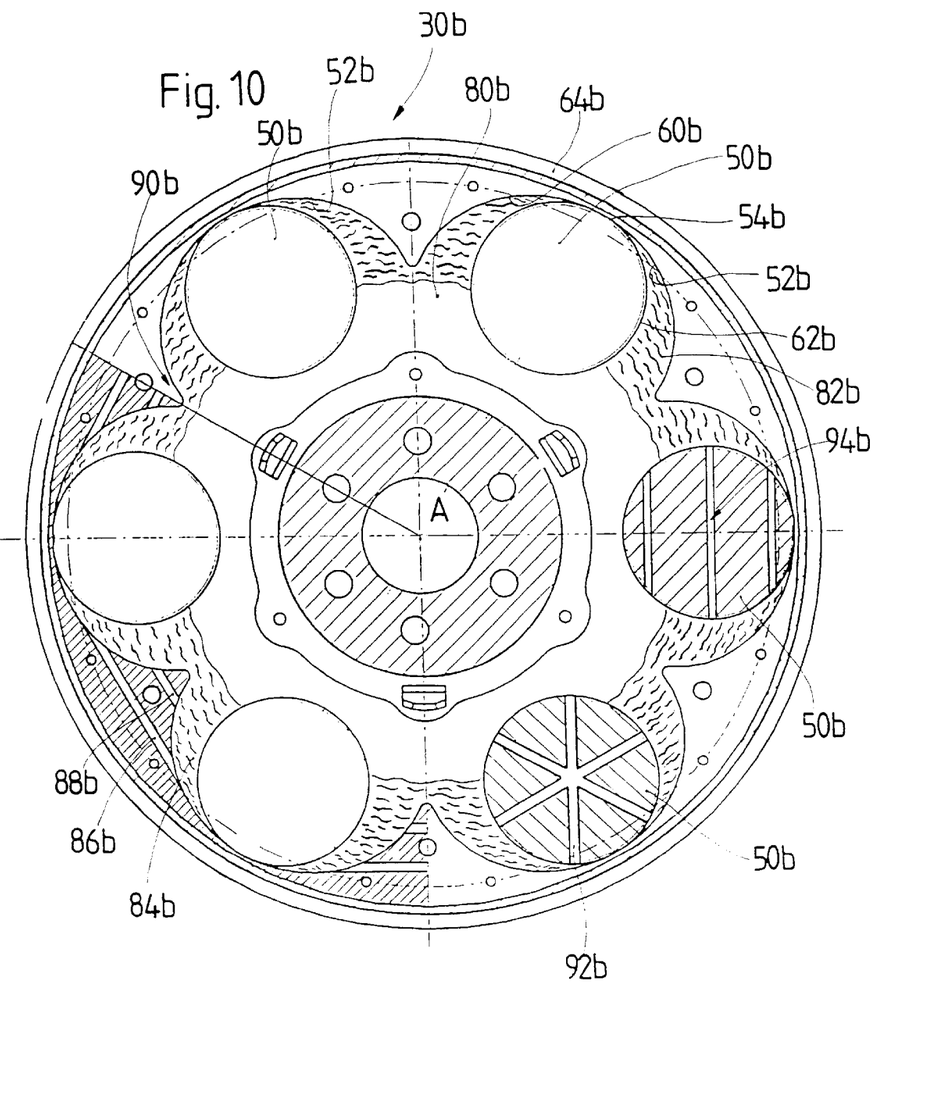
FIG. 10 is a partial axial sectional view of a damping device in which the deflection masses move at least partly in a damping fluid.
Figure 11A:
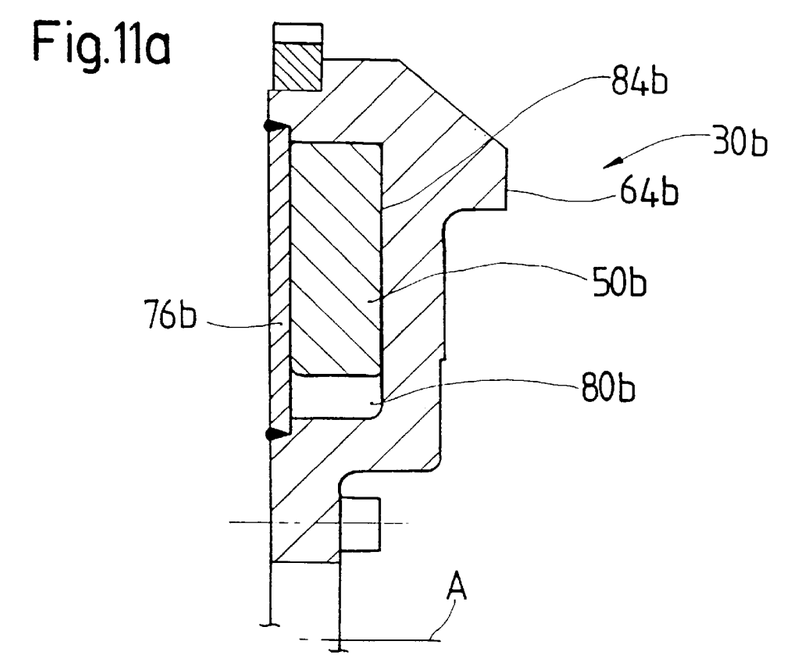
FIGS. 11a and 11b are partial longitudinal sectional views showing different configurations of the device shown in FIG. 10.
Figure 11B:
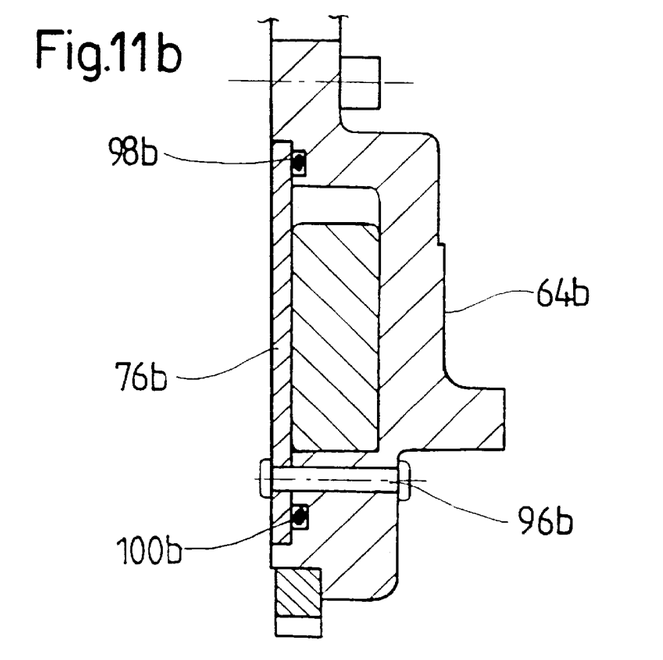

Another alternative embodiment form of a vibration damper is shown in FIGS. 10, 11a, and 11b. Components which correspond with respect to construction or function to the components described above are provided with the same reference numbers but with the addition of a suffix "b".

According to this embodiment, a vibration damping device 30b includes a plurality of deflection paths 52b distributed successively in the circumferential direction about the axis of rotation A in a depression space 80b of a base body 64b. The deflection paths 52b define the radial outer side of the depression space 80b which are partly filled with a viscous medium, for example, a fluid 82b. During rotary operation, the fluid 82b collects in the radial outer area of the depression space 80b so that individual deflection masses 50b which are held against the deflection paths 52b by centrifugal forces are at least partially immersed in this fluid and are required to move at least partly in the fluid 82b when the deflection masses 50b are deflected out of their position associated with the vertex areas 54b. The movement of the individual substantially circular-cylindrical deflection masses 50b along the deflection paths 52b is made more difficult by the fluid 82b. That is, the fluid 82b adds resistance to the movement of the deflection masses 50b. Accordingly, the natural frequency of the individual oscillators is affected by resistance to movement caused by the fluid 82b. To provide a natural frequency oscillation independent from the amplitude of deflection, the deflection paths 52b again preferably have an epicycloidal shape. Further, the depression space 80b is advantageously filled with fluid until the deflection masses 50b are completely submerged in the fluid 82b in every deflection position and must accordingly always move in the same manner against the resistance of the fluid 82b.

Each deflection path 52b defines a fluid chamber area 84b and directly adjacent fluid chamber areas 84b are interconnected by fluid channels 86b, 88b. When the individual deflection bodies 50b move along their deflection path, the fluid 82b displaced by the deflection bodies 50b may be displaced in an adjacent fluid chamber area 84b not only via the areas 90b which are at minimum distance from the axis of rotation A, but the fluid may also move through the channels 86b, 88b. The natural frequency of the oscillator may also be influenced by this flow movement, because the fluid columns contained in the individual fluid channels 86b, 88b also have respective natural frequencies.

Further, to change the vibration behavior, channel arrangements 92b or 94b may also be introduced in the individual deflection masses 50b. Referring to FIG. 10, the channel arrangement 92b penetrates the deflection body 50b in a star-shaped manner, whereas the channel arrangement 94b has substantially parallel channel portions. To achieve a movement characteristic which is independent from the rotational position of the respective deflection mass 50b, channel arrangement 92b is preferred, since it always enables the fluid to pass through in almost identical manner. Either channel arrangement 92b or 94b may be used in all or some of the deflection masses. Furthermore, every other deflection mass may have a different channel arrangement 92b, 94b as shown in FIG. 10.

In the damper 30b according to FIG. 10, the energy removed from a vibrational excitation is converted into pure kinetic energy of the deflection masses 50b which is given back to the system again, and an energy discharge is generated in the displacement of the fluid 82b by the generated frictional energy, induced by the movement of the deflection masses 50b in a relatively viscous fluid 82b, e.g., grease or oil.

FIGS. 11a and 11b show how fluid chamber areas 84b of the type mentioned above may be sealed. This sealing may comprise a simple seal because there is no need to seal parts rotating relative to one another. For example, in FIG. 11a, the depression space area 80b may be sealed by insertion of an annular cover plate 76b which is located at the radial inner edge and at the radial outer edge in a shoulder depression area and welding of the annular cover plate 76b therein. FIG. 11b shows another arrangement in which the cover plate 76b is secured by a plurality of fastening pins 96b, for example, rivet bolts 96b, distributed in the circumferential direction. In this case, radial inner and radial outer seal rings 98b, 100b are provided for achieving the sealing positioning of the cover plate 64b at the base body 64b.

Figure 12:
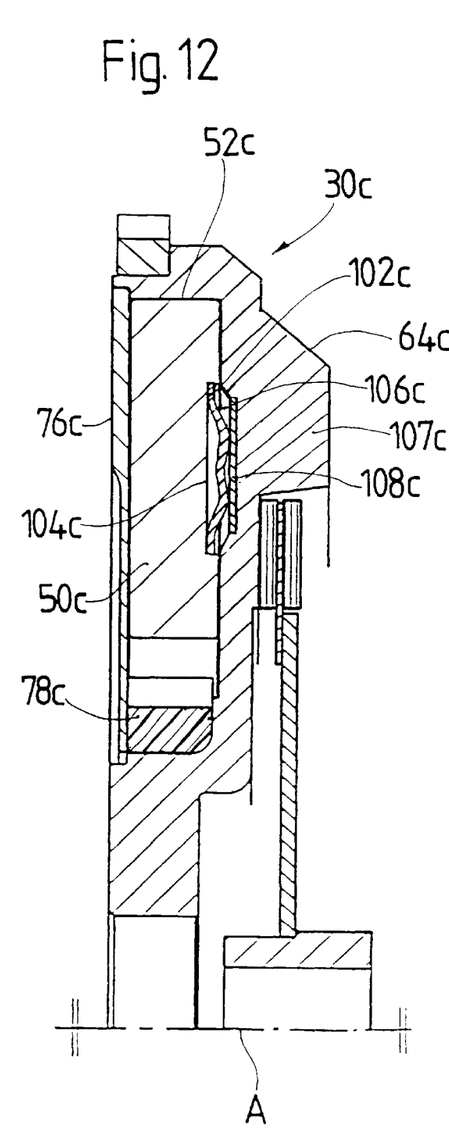
FIGS. 12–15 show longitudinal sectional views of different embodiment forms of damping devices according to the present invention.

FIG. 12 shows another alternative embodiment of a vibration damper 30c according to the present invention. Components which correspond with respect to construction or function to the components described above are provided with the same reference numbers but with the addition of a suffix "c".

A depression 104c is positioned in the deflection mass 50c at a side of the deflection mass 50c facing the base body 64c. A curved spring arrangement, for example, in the form of a plate spring 102c, is arranged in this depression 104c. The plate spring 102c presses against a friction surface 108c which is received in a corresponding depression 106c in a wall 107c in the base body 64c. To achieve uniform movement, the plate spring 102c and depression 104c are preferably symmetric with respect to rotation relative to the center axis of a respective deflection mass 50c and the friction surface 108c is constructed annularly and extends about the axis of rotation A as a circular ring or ring segment. The rubbing action of the spring 102c at the friction surface 108c in this area and the pretensioning of every deflection mass 50c against the cover plate 76c introduce a defined friction moment. The natural frequency of the individual oscillators may be adjusted by selection of the surfaces rubbing against one another and the pretensioning force of the spring. Accordingly, the frequency to be damped may also be adjusted in this way.

Figure 13:
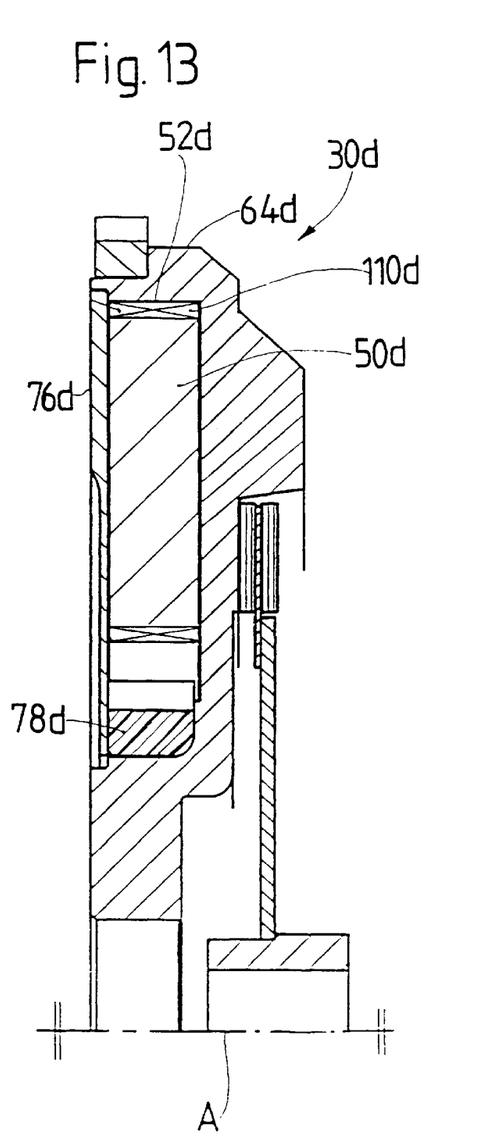

Another embodiment is shown in FIG. 13. Components which correspond with respect to construction or function to the components described above are provided with the same reference numbers but with the addition of a suffix "d".

In this embodiment, a vibration damper 30d comprises a bearing arrangement 110d enclosing each deflection mass 50d. The bearing arrangement 110d may comprise a rolling body bearing arrangement with an outer bearing ring and rolling bodies supporting this bearing ring on the mass 50d so as to be rotatable, but may also be a sliding bearing ring. Every deflection mass 50d moves on an associated deflection path 52d with this bearing arrangement 110d. Since a decoupling of the rolling movement from the rotational movement of the individual deflection masses 50d may be generated in this way, a defined influence on the vibration characteristic may again be achieved. Ultimately, this means that while the masses 50d move along the deflection paths, they do not roll. Rather, the deflection masses only undergo a displacement. Accordingly, no energy, or essentially no energy, is changed to rotational energy for a rotation about the center axis of the individual deflection masses 50d in this embodiment. This corresponds to the situation in which, for example, when using a sliding bearing, the individual deflection masses 50d slide along their deflection paths 52d and likewise do not, or essentially do not, rotate about their longitudinal axes.

Figure 14:
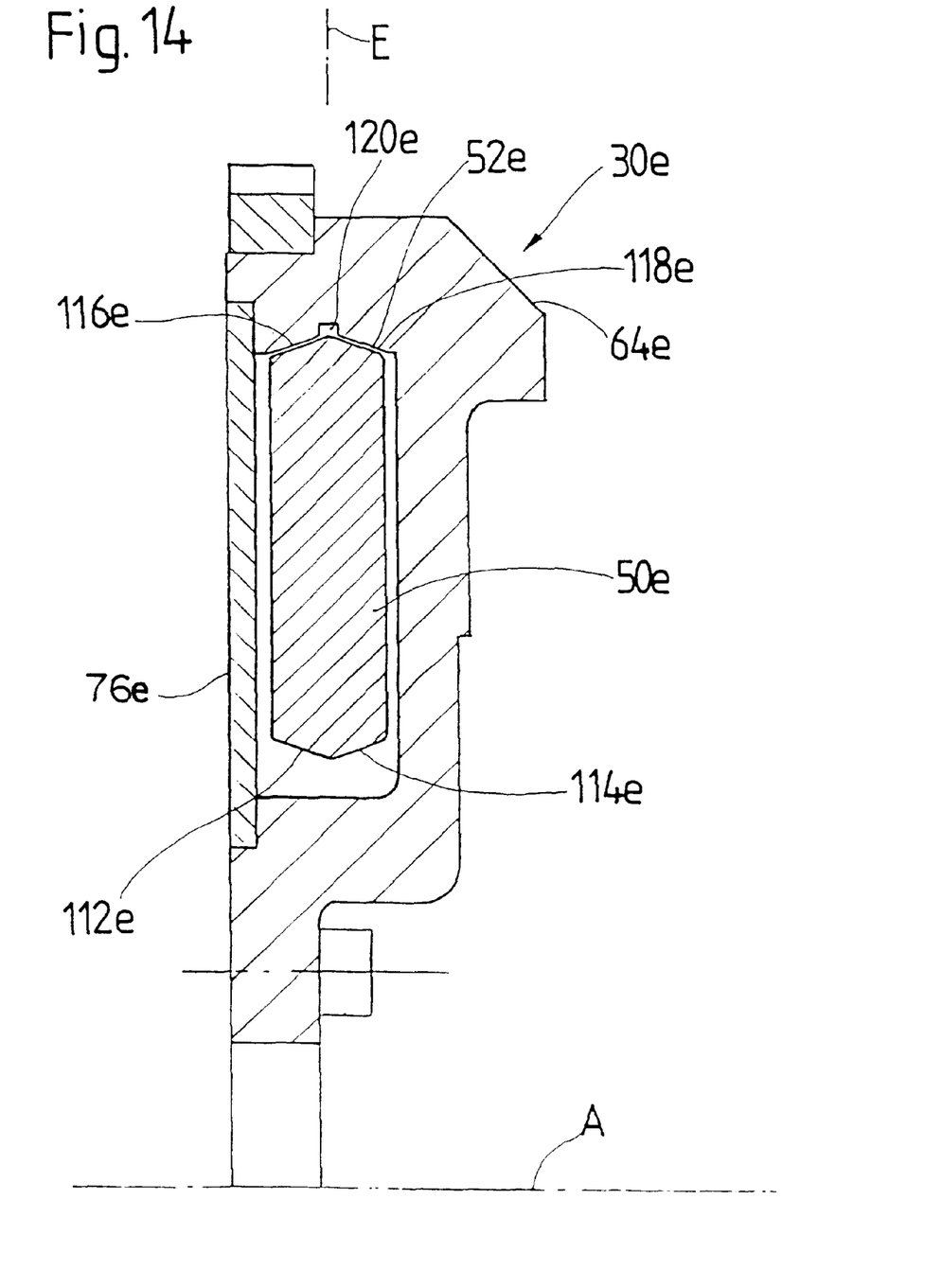

FIG. 14 shows another embodiment of a vibration damper 30e according to the present invention. Components which correspond with respect to construction or function to the components described above are provided with the same reference numbers but with the addition of a suffix "e".

In this embodiment, deflection masses 50e are constructed with an outer circumferential area having a V-shaped profile with two rolling surfaces 112e, 114e. In a corresponding manner, the individual rolling paths 52e comprise two surface regions 116e, 118e which run together in a V-shape (considered in longitudinal section). An annular groove-like area 120e is created in the area where these two surface regions 116e, 118e run together. Due to the adjoining of the surface regions 112e and 116e or 114e and 118e, respectively, every deflection mass 50e is held in a defined manner in, or with respect to, a plane E which is approximately orthogonal to the axis of rotation A. This arrangement generates a reduced contact pressing pressure because of the increased contact surfaces or line areas. Therefore, the deflection masses 50e can to a great extent be prevented from moving in the direction of the axis of rotation A and, in so doing, striking either the base body 64e or cover plate 76e. Contact of the deflection masses 50e could impair the natural frequency defined by the curvature of the deflection paths 52e and by the masses or mass moments of inertia of the deflection masses 50e to the least possible degree by the introduction of undefined friction. In this respect, a substantial contribution is made by the annular groove 120e which does not allow any squeezing to occur in the vertex area even with the smallest axial offset between a deflection mass 50e and the associated deflection path 52e. It is noted that a V-shaped path contour is not necessarily provided here. Slightly curved surface regions may also be considered.

Figure 15:
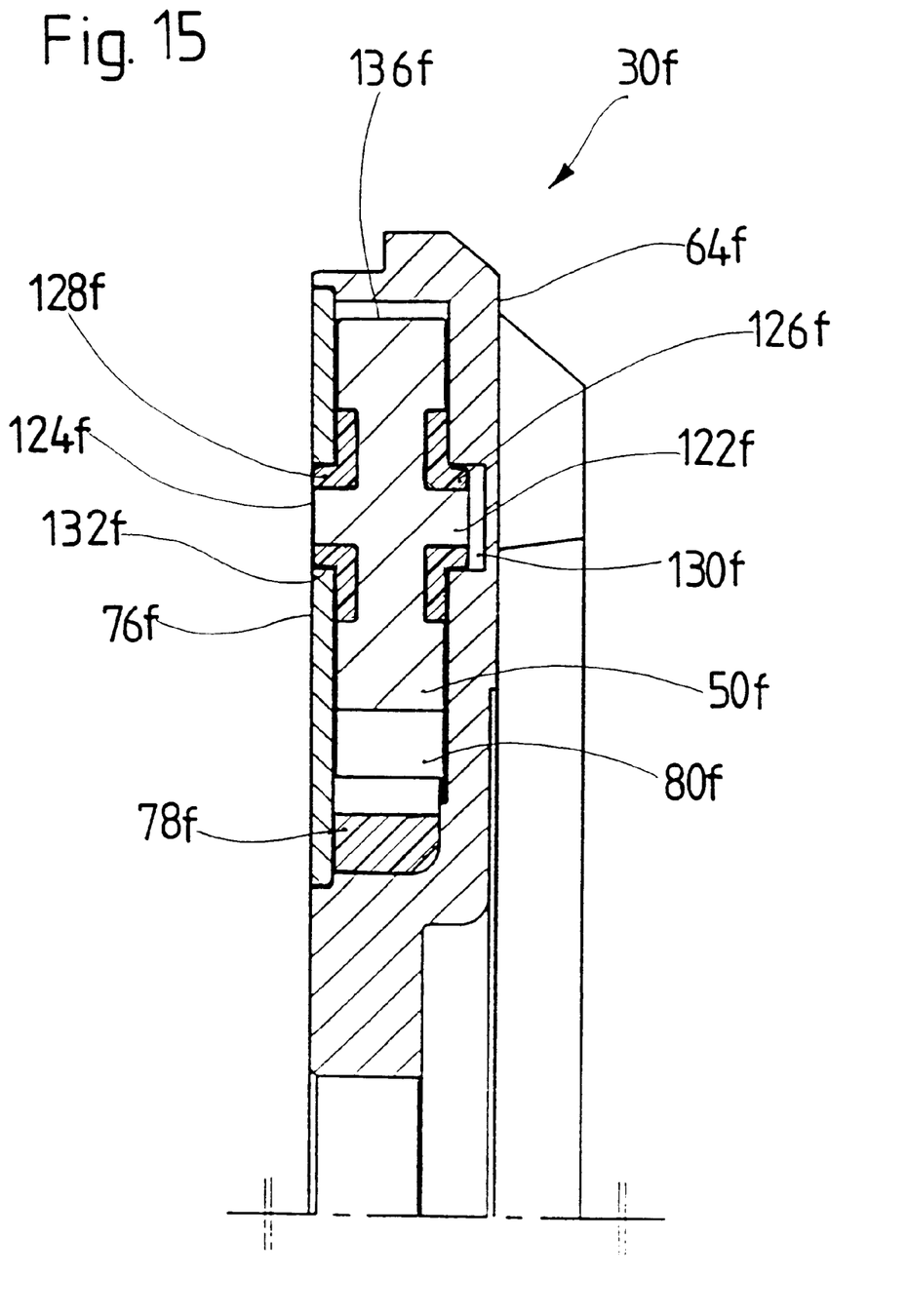
Figure 16:
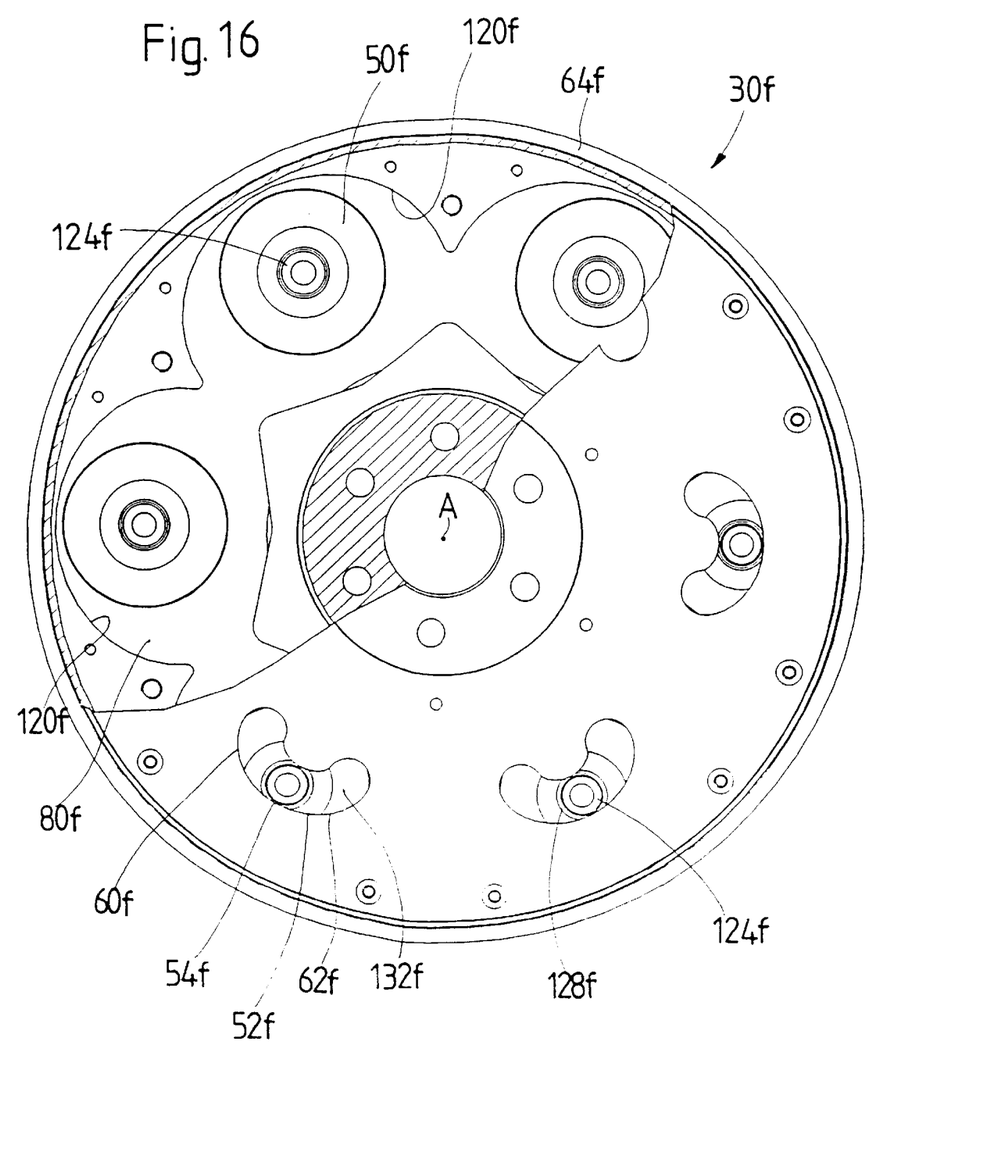
FIG. 16 is a partial axial view of the damping device shown in FIG. 15 with partially cut-away cover plate.

Another embodiment of a vibration damper 30f according to the present invention is shown in FIGS. 15 and 16.

Components which correspond with respect to construction or function to the components described above are provided with the same reference numbers but with the addition of a suffix "f".

In this embodiment, a depression space area 80f created in a base body 64f is defined by curved wall areas 120f arranged on the radial outside of the space 80f. However, these wall areas 120f do not form deflection paths in this embodiment. Rather, the individual deflection masses 50f have guide axles or guide projections 122f, 124f arranged on opposing axial sides. These guide projections 122f, 124f may be enclosed, for example, by bearing sleeves 126f, 128f. A guide recess 130f and guide opening 132f are respectively arranged in the base body 64f and the cover plate 76f so as to be associated with each of these guide axles 122f, 124f. As will be seen from FIG. 16 in particular, these recesses or openings 130f, 132f form the deflection paths 52f with respective vertex areas 54f and deflection areas 62f, 60f. The individual guide axles or guide projections 122f, 124f move along these deflection paths and, in so doing, guide all of the deflection masses 50f along the guide paths and openings 130f, 132f which are curved with respect to the axis of rotation. It will be seen that the deflection masses 50f do not contact the base body 64f by their outer circumferential area 136f. The rolling movement or the sliding movement takes place exclusively in the area of the guide axles 124f, 122f. If the guide axle 124f, 122f roll on the guide path, the deflection masses with rotate much faster than if the outer circumference of the deflection bodies rolls on a deflection path. This occurs because of the smaller rolling radius. Therefore, an increased proportion of energy may be absorbed in the rotation of the individual deflection masses 50f in the vibration damping device 30f than a damping device which rolls on its outer circumference. Sliding may be prevented to a great extent, for example, by suitable selection of the surface regions of the sleeves 126f, 128f rolling against one another and the recesses and openings 130f, 132f for the latter. However, if only a displacing movement of the individual deflection masses occurs, it will be ensured in this case by providing bearing arrangements, for example, sliding bearings or rolling body bearings, that the rotational movement generated by the rolling is not generally transmitted to the deflection masses.

The preceding description relates to individual possibilities for adjusting the natural frequency of a speed-adaptive damper with at least one deflection mass moving along a deflection path. Of course, all of the embodiment forms described above may also be applied in the different areas shown in FIGS. 1 to 4. Such embodiment forms may also, of course, be combined.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A vibration damping device for a motor vehicle drive system, comprising:
   a base body rotatable about an axis of rotation; and
   a deflection mass arrangement arranged in said base body and comprising a deflection mass and a deflection path associated with said deflection mass and along which the deflection mass is movable during rotation of the base body about said axis of rotation,
   wherein the deflection path comprises a vertex area in an area of said deflection path located furthest from said axis of rotation, deflection areas arranged on two opposing axial sides of said vertex area and projecting substantially axially, and additional deflection areas proceeding substantially circumferentially from two opposing circumferential sides of said vertex area, wherein said deflection areas and said additional deflection areas are connected to form a deflection field for said associated deflection mass, wherein said deflection field faces said axis of rotation and is curved toward said axis of rotation proceeding from said vertex area.

2. The vibration damping device of claim 1, wherein said deflection mass comprises a substantially spherical deflection body.

3. The vibration damping device of claim 1, wherein said deflection path extends at least partly in a viscous damping medium.

4. A vibration damping device for a motor vehicle drive system, comprising:
   a base body rotatable about an axis of rotation; and
   a deflection mass arrangement arranged in said base body and comprising a deflection mass and a deflection path associated with said deflection mass and along which the deflection mass is movable during rotation of the base body about said axis of rotation,
   wherein the deflection path comprises a vertex area in an area of said deflection path located furthest from said axis of rotation and deflection areas arranged on two opposing axial sides of said vertex area and projecting substantially axially, said deflection path extending at least partly in a viscous damping medium, said vibration damping device further comprising a plurality of deflection paths following one another in the circumferential direction, wherein each of said plurality of deflection paths defines a respective damping medium chamber; and
   a channel arrangement connecting at least two circumferentially adjacent ones of said plurality of damping medium chambers for exchange of damping medium therethrough.

5. The vibration damping device of claim 4, wherein said channel arrangement opens into a portion of said respective deflection paths defining said damping medium chamber.

6. The vibration damping device of claim 4, wherein said viscous damping medium comprises a damping fluid.

7. A vibration damping device for a motor vehicle drive system, comprising:

a base body rotatable about an axis of rotation; and a deflection mass arrangement arranged in said base body and comprising a plurality of deflection masses and a plurality of deflection paths respectively associated with said plurality of deflection masses and along which said plurality of deflection masses are movable during rotation of the base body about said axis of rotation, wherein first and second of said plural deflection masses comprise one of a different mass and a different mass moment of inertia, said first and second one of said plurality of deflection masses being associated with first and second ones of said plurality of deflection paths, wherein at least two of said plurality of deflection masses are arranged to follow one another in the axial direction.

8. The vibration damping device of claim 7, wherein each of said plurality of deflection paths extends at least partly in a viscous damping medium.

9. The vibration damping device of claim 7, wherein each of said plurality of deflection paths defines a respective damping medium chamber; and said base body comprises a channel arrangement connecting at least two adjacent ones of said plural damping medium chambers for exchange of damping medium therethrough.

10. The vibration damping device of claim 9, wherein said channel arrangement opens into a portion of said at least two adjacent ones of said deflection paths defining said damping medium chamber.

11. The vibration damping device of claim 7, wherein at least one of said plural deflection masses comprises a channel arrangement for allowing passage of damping medium.

12. The vibration damping device of claim 7, wherein said viscous damping medium comprises a damping fluid.

* * * * *